United States Patent [19]

Norris

[11] 4,337,916
[45] Jul. 6, 1982

[54] ADJUSTABLY ORIENTABLE PLANT HANGER

[76] Inventor: Theodore C. Norris, 70 Sproul Rd., Malvern, Pa. 19355

[21] Appl. No.: 197,647

[22] Filed: Oct. 16, 1980

[51] Int. Cl.$^3$ .............................................. F16M 13/00
[52] U.S. Cl. .................................. 248/558; 248/318; 24/115 G; 24/115 R
[58] Field of Search .............. 248/317, 318, 320, 323, 248/328, 558; 24/115 G, 115 R, 136 R; 47/67

[56] References Cited

U.S. PATENT DOCUMENTS

| | | | |
|---|---|---|---|
| 2,015,403 | 9/1935 | Kiddle | 24/115 R X |
| 2,189,865 | 2/1940 | Petersen | 24/115 G X |
| 3,133,781 | 5/1964 | Rys et al. | 24/115 R X |
| 3,915,419 | 10/1975 | Brown et al. | 248/318 |
| 4,057,210 | 11/1977 | Wellman | 47/67 |
| 4,059,333 | 11/1977 | Mixon | 24/136 R X |
| 4,117,630 | 10/1978 | Kalas | 47/67 |
| 4,262,873 | 4/1981 | Prenger | 47/67 X |

*Primary Examiner*—William H. Schultz
*Attorney, Agent, or Firm*—Charles A. McClure

[57] ABSTRACT

A cord sling type of plant hanger is provided with means strung on the suspending cords for manual adjustment of the plant orientation about the vertical axis. The adjustment means include an arch-shaped member and a regular polygonal button-like member engageable snugly within the archway to retain a given orientation. The polygonal member is laterally disengageable from the arch-shaped member enabling it to be twisted about the vertical, together with a suspended plant container, and be re-engaged laterally at a different orientation.

14 Claims, 15 Drawing Figures

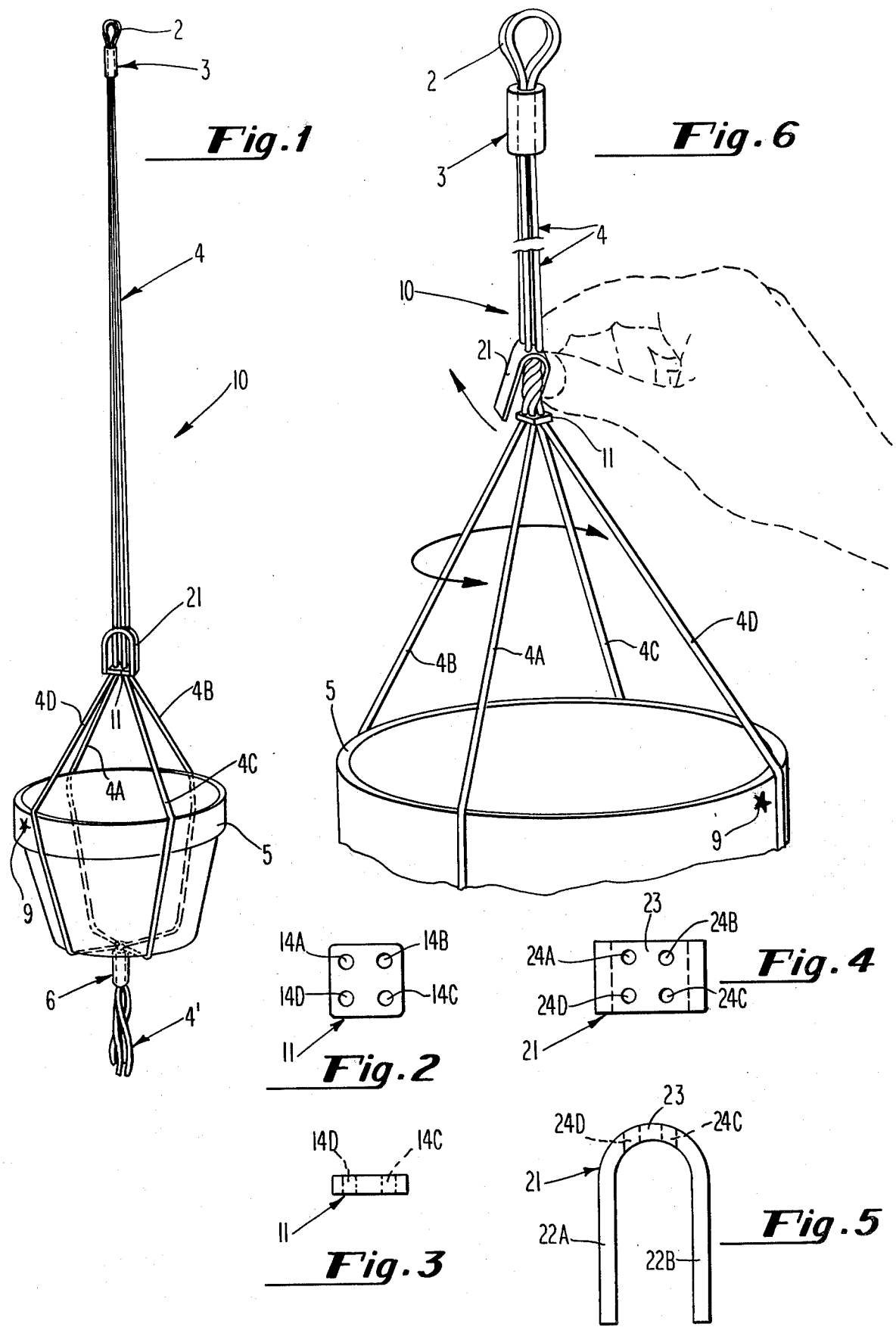

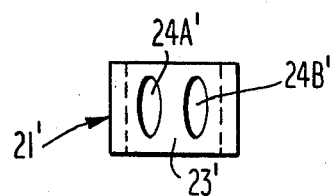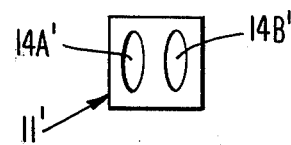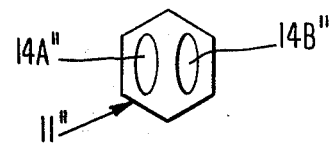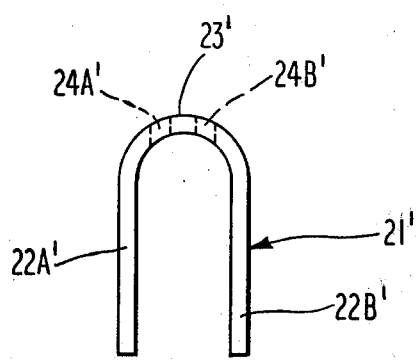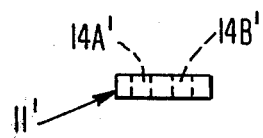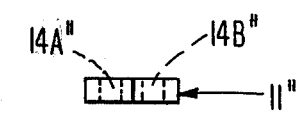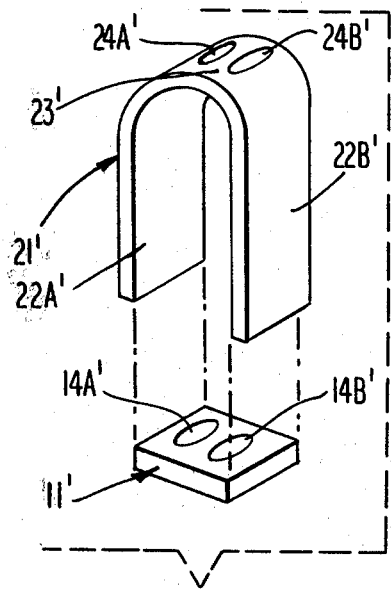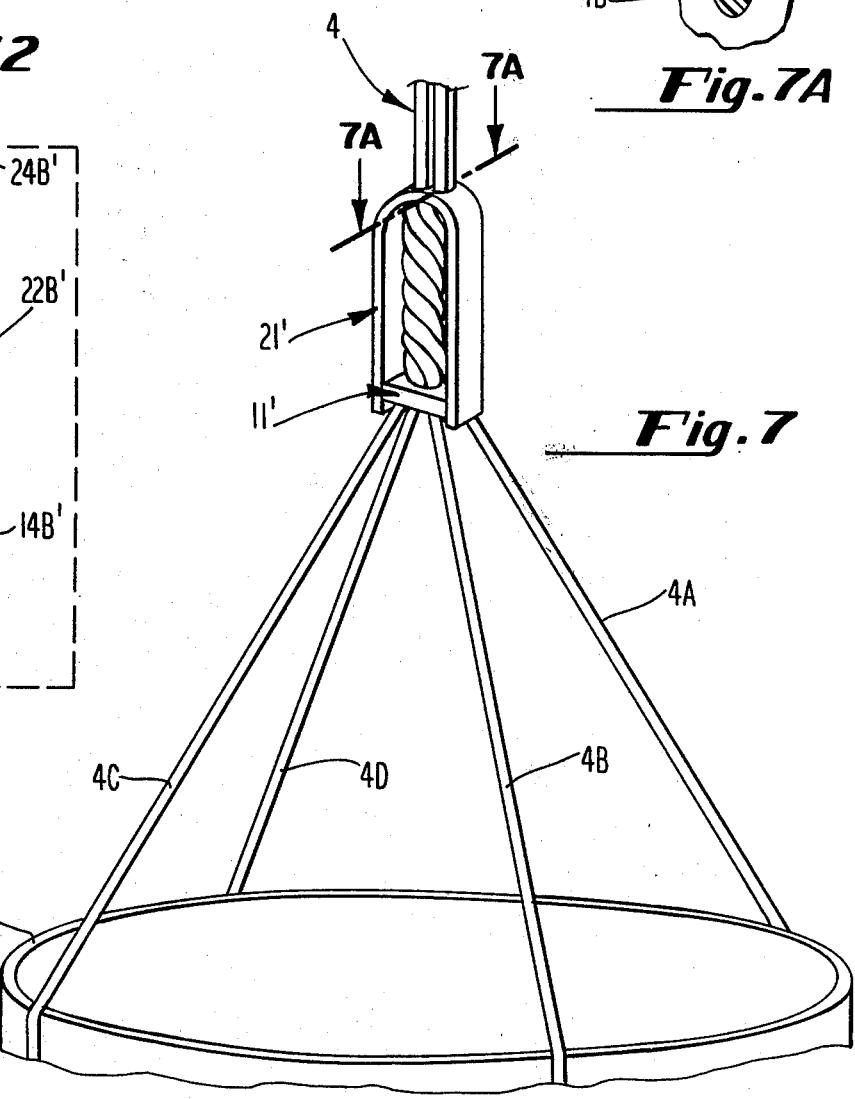

ADJUSTABLY ORIENTABLE PLANT HANGER

This invention relates to a cord sling type of hanger for potted plants or the like provided with means enabling manual adjustment to any of several or more orientations about the vertical.

Potted plants exposed to a directional light source, usually but not always sunlight, tend to grow unevenly, usually with little foliage on the shaded side and an excess of growth and often a noticeable tilt toward the light source on the other side. More even growth can be assured by adjusting the plant container horizontally (i.e., reorienting it about the vertical) from time to time. If the container is resting on a solid surface, such adjustable orientation is easy, but if the container is supported in a sling of cords or the like, adjustment is more difficult and is usually limited to a half-turn at a time, which can result in growth undulations in stem, trunk, vine, etc.

Rotating a sling-supported container manually about the vertical twists the cords of the sling, but they promptly untwist when manual contact is discontinued, allowing the container to rotate under the influence of gravity, often back to the original neutral orientation. The point of support of the sling is usually overhead and awkward to reach, so removing the sling from the support to rotate it and the supported plant, and then hanging it up again is often hazardous to both plant and person. Also, as suggested above, reversing a suspension loop 180 degrees at the point of support is too gross an adjustment to be optimally beneficial.

Attempts to provide mechanically assisted adjustment for a plant hanger or similar suspension usually pose hardware installation problems, are unsightly, and are insufficiently positive or overly so in operation. Examples include the freely rotatable swivel hook of Holtz U.S. Pat. No. 3,957,242 and the clockwork rotator of Wengel U.S. Pat. No. 4,005,843. Complex supporting mechanisms not only are characteristically cumbersome, expensive, and maintenance-prone, they have the additional defect of limiting the degree of adjustability or even removing it entirely from control by the plant owner. Thus, a need exists for a simple, inexpensive, attractive, and trouble-free means for enabling a sling-supported plant to be adjusted by hand to desired orientations about the vertical.

A primary object of the present invention is manual adjustability of a cord-slung plant container or the like orientably about the vertical.

Another object of this invention is provision of a sling type of plant support with at least several orientation adjustment angles about the vertical.

A further object of the invention is provision of simple manually adjustable means for accomplishing the foregoing objects.

Other objects of the present invention, together with means and methods for attaining the various objects, will be apparent from the following description and the accompanying diagrams of preferred embodiments thereof, which are presented by way of example rather than limitation.

FIG. 1 is a perspective view of one embodiment of this invention installed in otherwise conventional sling means for suspending a potted plant container;

FIG. 2 is a plan view of a component shown on a smaller scale in the preceding view;

FIG. 3 is a side elevation of the component shown in FIG. 2;

FIG. 4 is a plan view of another component shown on a reduced scale in FIG. 1 in cooperation with the component of FIGS. 2 and 3;

FIG. 5 is a side elevation of the component shown in FIG. 4; and

FIG. 6 is a perspective view of the same embodiment shown on an intermediate scale during manual adjustment of the orientation of the plant container about the vertical.

FIG. 7 is a perspective view of another embodiment of this invention installed similarly to the embodiment in FIG. 1 but with part of the conventional sling means cut away;

FIG. 7A is a fragmentary sectional plan, considerably enlarged, taken along 7A—7A in the preceding view;

FIG. 8 is an exploded perspective view of cooperating components shown on a smaller scale in FIG. 7;

FIG. 9 is a plan view of one of the components of FIG. 8;

FIG. 10 is a side elevation of the component of FIG. 9;

FIG. 11 is a plan view of another component of FIG. 8; and

FIG. 12 is a side elevation of the component of FIG. 11.

FIG. 13 is a plan view of an alternative to the component of FIGS. 9 and 10; and FIG. 14 is a side elevation of the component of FIG. 13.

In general, the objects of the present invention are accomplished, in an adjustably orientable suspension means for a potted plant container or the like including funicular means depending from a fixed point of support and supportably engaging the plant container, by means of orientation adjustment means strung onto the funicular means intermediate the point of support and the plant container. The adjustment means comprises a plurality of mutually engageable and disengageable pieces strung onto the funicular means and capable of being reoriented about the vertical relative to one another only when disengaged and capable of being engaged in at least several orientations about the vertical. Included are an arch-shaped piece and a polygonal piece fitting snugly but removably in the archway, the sidewalls of the arch being spaced apart just sufficiently to admit the polygonal piece in fixed orientation thereto. The pieces have medial bores therethrough just large enough to admit the funicular means in frictional engagement therewith.

More particularly, the polygonal piece is strung onto strands of cording or the like above the plant container, and the arch-shaped piece is strung onto the strands above the polygonal piece, whereupon the polygonal piece can be engaged within the archway and can be disengaged therefrom. The polygonal piece is rotatable about the vertical while disengaged and is re-engageable therewith subsequently with the plant container adjusted horizontally relative to its orientation in the previous engagement.

Once the mutually engageable pieces are successfully manually slid along the strands sufficiently to be engaged with one another they can be disengaged and re-engaged laterally (without sliding therealong) merely by bending the strands and can be reoriented while disengaged upon twisting the strands.

FIG. 1 shows, in perspective, a first embodiment of this invention installed in otherwise conventional sling means 10 for suspending a potted plant container or the like. Assemblage 4 of strands is formed into loop 2 at the top end to receive a hook, nail, screw, swivel arm, or similar member to constitute a suitable point of support. Loop-clinching sleeve 3 surrounds the strand assemblage near the top end and can be moved up to clinch the loop securely about a suitable supporting member within the loop or be moved down to loosen the loop to facilitate unlooping the strand assemblage from such support. Near the bottom end of the strand assemblage height-adjusting sleeve 6 is snugged up against the bottom of container 5 for a potted plant (not shown) or the like, with loose ends 4' of the strand assemblage dangling below the sleeve. Star 9 on the container is an orientation marker.

Located at an intermediate level in FIG. 1, between the point of support and the container are button-like polygonal piece 11 and arch-shaped piece 21, which together comprise adjustable orientation means according to the present invention, strung onto the strands of the assemblage and shown with the polygonal piece engaged between the sidewalls of the arch-shaped piece. Below the polygonal piece the strand assemblage diverges into four individual strands 4A, 4B, 4C, and 4D, which are more readily visible individually here, as they pass downward and along the outside of the container, than in the rest of the assemblage.

It will be understood that the strand assemblage is strung through one or more medial bores not readily visible in FIG. 1 but shown in subsequent views of the pieces. Here the "medial" has as its reference the central vertical axis, locating a single medial bore as being essentially coincident therewith, whereas a plurality of medial bores would be located off such axis but symmetrically located with regard thereto. Each such bore is of such size as to receive one or more (as desired) of the strands of the assemblage therethrough in sufficient frictional engagement as to be movable therealong manually but otherwise fixed relative thereto. The respective sleeves surround the entire strand assemblage in like frictional engagement therewith.

FIG. 2 shows in plan, and FIG. 3 in side elevation, square-sided polygonal piece 11 having four medial bores 14A, 14B, 14C, and 14D therethrough spaced near the respective corners.

FIG. 4 shows in plan, and FIG. 5 in side elevation, arch-shaped member 21 having sidewalls 22A, 22B, Arch or bight 23 (square in plan) has four medial bores 24A, 24B, 24C, and 24D therethrough located near the corners of the bight similarly to the bores in the square piece of the preceding views.

FIG. 6 shows, in perspective, the orientation adjustment pieces of the preceding views strung onto the strand assemblage of a sling type of a plant hanger as before but during the adjustment process instead of at a neutral rest position (as in FIG. 1).

The arch-shaped member is shown swung manually aside at its lower end (note adjacent single-ended arrow) to disengage its sidewalls from straddling engagement with the sides of the square piece, whereupon the latter is reorientable (as shown by the double-ended arrow) and then re-engageable with the arch-shaped member at a new orientation. The container orientation in FIG. 2 (see star 9) represents a 270-degree rotation clockwise (viewed from above) relative to the orientation shown in FIG. 1; the twist visible in the strand assemblage between the two adjustment pieces distinguishes it from a 90-degree counterclockwise rotation—although either is possible, as suggested by the arcuate double-ended arrow.

It will be understood that the orientation of the arch-shaped member is determined by looping of the strands over the nail or similar support, or alternatively by tying of the cords to it, etc. Thus, reorientation of the polygonal piece relative to the arch-shaped member changes the orientation of the supported container—unless the lower member is given a complete 360° turn (or integral multiple thereof).

If the plant is low enough to water, its container can conveniently be readjusted by 90 degrees, for example, at each watering or at any other suitable interval without any stress to the person or risk of damage to the plant.

Experience with the foregoing inventive embodiment, in which each bore receives a single strand, has demonstrated that the individual strands tend to rotate slightly within their respective bores during rotational reorientation of the container, thereby causing the adjusted rest or neutral position to deviate somewhat from the "theoretical" as described above. Such deviation is aggravated as the reorientation angle increases and by conformity in shape of the strand cross-section and the bore cross-section. Thus, if a plant owner wanted to rotate the plant container 90 degrees in one direction each day of the week for a week (and then likewise in the opposite direction the next week) the total weekly rotation would be appreciably less than 630 degress. More important, the angle turned on the last day of the week would be considerably less than on the first day, which might be somewhat adverse to the desired exposure of the plant.

FIG. 7 shows, in perspective, another embodiment of this invention, in which reference numerals for parts corresponding to parts in the embodiment shown in previous views are distinguished therefrom by addition of primes. For that reason some parts are not specifically mentioned. The only difference in this alternative embodiment is that the medial bores are reduced in number and are elongated transversely into elliptical or oval shape, as is more readily visible in the exploded view (less strands) of FIG. 8, which shows polygonal piece 11' and arch-shaped piece 21' with two bores apiece (similarly primed). Each such bore accommodates two strands side-by-side as shown on an enlarged scale in the indicated sectional detail view of FIG. 7A, which shows strands 4A and 4B compressed into adjacent rounded triangular shapes in respective halves of bore 24B' of arch-shaped piece 21'. This renders the adjustable orientation feature of the resulting hanger more positive because friction between adjacent strands in a single bore effectively eliminates relative rotation between bore and strand.

FIGS. 9 through 12 shows polygonal piece 11' and arch-shaped piece 21' of this embodiment in like manner as FIGS. 2 through 5 showed corresponding pieces 11 and 21 of the previous embodiment.

Finer adjustability is attainable by providing the polygonal piece with more sides, say six instead of only four. Desired is a regular polygon with an even number of sides so that the separation of its opposite side edges remains constant—at slightly less than the separation of the sidewalls of the arch-shaped piece for snug engagement. FIGS. 13 and 14 show such a piece, with its reference numerals double-primed for distinction, and with its bores elongated as in the second embodiment.

When the container is supported (as shown here) by the strands looping under it and also looping about the overhead support, one continuous length of cord could suffice, but adjustment of it lengthwise relative to the other members of the arrangement would be awkward and really impracticable. If to be tied to openings in (or bosses on) the container, separate strand lengths are mandatory. In any event, by "plurality of strands" is meant here the number of strand lengths between the point of support and the plant container. Actually there must be more than two supporting strands, preferably four (as shown here) or more for even support and stability.

The polygonal and arch-shaped pieces of this invention should be relatively rigid so as to be positively engageable. They may be made of wood, plastic, or metal, or even of shell or bone, etc. if desired. The arch-shaped member may flex open slightly to facilitate engagement with the polygonal member. Notwithstanding that equal numbers of bores were shown in both pieces of the same embodiment, (although the number of bores was different in the respective embodiments), it should be understood that mutually engageable pieces may have different numbers of bores. For example, the arch-shaped piece may have two elongated bores while the polygonal piece has four round ones—or even a single square one—or vice versa.

The strands may be made of any suitably flexible material, preferably not too slippery. Cotton is fine, and nylon or polypropylene is suitable, for example. The cross-section need not be circular, as is customary with cording, but may advantageously be rectangular as in tape. Braided, woven, or even solid monofilament construction are usually acceptable. Twist constructions can be disadvantageous because twisting of the strands in reorientation rotation may tend to untwist them.

Notwithstanding illustration and description of preferred embodiments of this invention, a few modifications have been suggested above. Other modifications, as by adding, combining, or subdividing parts, or substituting equivalents, may be made while retaining at least some of the benefits of the invention, which itself is defined in the following claims.

The claimed invention:

1. Suspension means for hanging a potted plant container or the like from a fixed point of support for adjustable orientation about the vertical, comprising strand or similar funicular means for attachment to such point of support so as to hang down and supportably engage such potted plant container, plus cooperating orientation adjustment means strung onto the funicular means intermediate the point of support and the container and comprising a plurality of mutually engageable and disengageable pieces capable of being reoriented about the vertical relative to one another only when disengaged and capable of being engaged in at least several orientations about the vertical.

2. Suspension means according to claim 1, wherein one such piece is polygonal in plan and another such piece is open to fit closely about a plurality of the sides of such polygonal piece when mutually engaged.

3. Suspension means according to claim 2, wherein the first piece is square in plan and the second piece is arch-shaped with its archway wide enough to receive the square piece in engagement therewith.

4. Suspension means according to claim 1, 2, or 3, wherein each of the cooperating pieces has at least one medial bore therein to receive the funicular means therethrough and in frictional engagement therewith.

5. In an adjustably orientable potted plant hanger including a plurality of strands of cord or like funicular means depending from a fixed point of support and supportably engaging the plant container, the improvement comprising a regular polygonal piece having a plurality of medial bores therethrough and an arch-shaped piece having a plurality of medial bores through the arch, the archway being just wide enough to admit the polygonal piece in fixed orientation therein, the bores through the rigid pieces being just large enough to admit the strands in frictional engagement therewith.

6. Plant hanger according to claim 5, wherein the degree of frictional engagement resists sliding of the strands relative to the rigid pieces under the weight of the potted plant but permits sliding relative thereto by application of extra manual force.

7. Plant hanger according to claim 5, wherein the polygonal piece is strung onto the strands above the plant container, and the arch-shaped piece is strung onto the strands above the polygonal piece, whereupon the polygonal piece can be engaged laterally between the sidewalls of the arch and can be disengaged laterally therefrom, for adjustment of the polygonal piece rotatably about the vertical and re-engagement therewith subsequently with the plant container adjusted horizontally relative to its orientation in the previous engagement.

8. Plant hanger according to claim 7, wherein the number of bores through each of the engageable pieces equals the number of strands.

9. Plant hanger according to claim 7, wherein the number of bores through at least one of the engageable pieces is a submultiple of the number of strands.

10. Plant hanger according to claim 7, wherein at least one of the pieces has at least one medial bore therethrough having a cross-section other than circular.

11. Plant hanger according to claim 10, wherein at least one such bore has an elliptical cross-section.

12. Suspension means according to claim 1, wherein the pieces both have a plurality of strand-receiving medial bores therethrough.

13. Suspension means according to claim 12, strung onto a plurality of strands through the bores, with the respective pieces frictionally engaged therewith but manually slidable therealong relative to one another and laterally engageable with and disengageable from one another.

14. Suspension means according to claim 12, wherein at least one of such bores in at least one of such pieces is elliptical in cross-section.

* * * * *